(12) United States Patent
Little

(10) Patent No.: US 7,505,640 B2
(45) Date of Patent: Mar. 17, 2009

(54) INTEGRATED OPTICS POLARIZATION BEAM SPLITTER USING FORM BIREFRINGENCE

(75) Inventor: Brent Everett Little, Glen Head, NY (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/787,795

(22) Filed: Apr. 18, 2007

(65) Prior Publication Data

US 2007/0196042 A1 Aug. 23, 2007

Related U.S. Application Data

(60) Division of application No. 11/329,342, filed on Jan. 10, 2006, which is a continuation of application No. 10/661,891, filed on Sep. 15, 2003, now Pat. No. 7,035,491.

(51) Int. Cl.
G02B 6/00 (2006.01)
G02B 6/26 (2006.01)

(52) U.S. Cl. .......................... 385/11; 385/27
(58) Field of Classification Search ................ 385/11, 385/27
See application file for complete search history.

(56) References Cited

U.S. PATENT DOCUMENTS

| | | | |
|---|---|---|---|
| 4,772,084 A | 9/1988 | Bogert | |
| 4,781,424 A * | 11/1988 | Kawachi et al. | 385/132 |
| 4,900,112 A * | 2/1990 | Kawachi et al. | 385/14 |
| 4,978,188 A * | 12/1990 | Kawachi et al. | 385/130 |
| 5,056,883 A | 10/1991 | Diemeer et al. | |
| 5,111,517 A | 5/1992 | Riviere | |
| 5,133,029 A | 7/1992 | Baran et al. | |
| 5,151,957 A | 9/1992 | Riviere | |
| 5,293,436 A | 3/1994 | Diemeer | |
| 5,341,444 A * | 8/1994 | Henry et al. | 385/11 |
| 5,475,771 A | 12/1995 | Hosoi | |
| 5,546,483 A * | 8/1996 | Inoue et al. | 385/14 |
| 5,889,899 A | 3/1999 | Henry et al. | |
| 5,946,434 A | 8/1999 | Lee | |
| 5,999,670 A * | 12/1999 | Yoshimura et al. | 385/31 |
| 6,278,821 B1 | 8/2001 | Carberry et al. | |
| 6,377,378 B1 * | 4/2002 | Frascolla et al. | 398/152 |
| 6,538,787 B1 * | 3/2003 | Moeller et al. | 398/158 |
| 6,639,681 B1 * | 10/2003 | Magne et al. | 356/478 |
| 6,757,454 B2 * | 6/2004 | Inoue et al. | 385/15 |
| 6,760,499 B2 * | 7/2004 | Pezeshki et al. | 385/14 |
| 7,010,198 B2 * | 3/2006 | Wessel | 385/40 |
| 2002/0122650 A1 * | 9/2002 | Kominato et al. | 385/131 |
| 2002/0159702 A1 * | 10/2002 | Liu et al. | 385/40 |
| 2002/0181870 A1 * | 12/2002 | Inoue et al. | 385/37 |
| 2003/0010905 A1 * | 1/2003 | Luo | 250/227.11 |
| 2003/0026518 A1 * | 2/2003 | Pezeshki et al. | 385/14 |
| 2004/0013337 A1 * | 1/2004 | Purchase et al. | 385/14 |
| 2004/0013357 A1 | 1/2004 | Bandyopadhyay | |
| 2004/0101227 A1 * | 5/2004 | Takabayashi et al. | 385/11 |
| 2004/0114859 A1 * | 6/2004 | Colgan et al. | 385/31 |
| 2004/0165826 A1 * | 8/2004 | Wessel | 385/40 |
| 2004/0179722 A1 * | 9/2004 | Moritoki et al. | 382/124 |

* cited by examiner

Primary Examiner—K. Cyrus Kianni
(74) Attorney, Agent, or Firm—W. Douglas Carothers, Jr.

(57) ABSTRACT

A method for separating the orthogonal polarization components of an incident optical signal into two spatially separated output ports is described. The method comprises a Mach-Zehnder interferometer where one of the two branches has a section of waveguide that exhibits form-birefringence. This integrated optic Polarization Beam Splitter (PBS) is broadband, has high extinction ratio, and has characteristics that are tunable.

14 Claims, 13 Drawing Sheets

Top-Down View non-birefringent waveguide        birefringent waveguide

Top-Down View

INTEGRATED OPTICS POLARIZATION BEAM SPLITTER USING FORM BIREFRINGENCE

CROSS-REFERENCE TO RELATED APPLICATIONS

This application is a divisional of U.S. Ser. No. 11/329,342, filed on Jan. 10, 2006, which is a continuation patent application of U.S. Ser. No. 10/661,891, filed on Sep. 15, 2003, now U.S. Pat. No. 7,035,491, issued Apr. 25, 2006; the contents of each of which are hereby expressly incorporated herein by reference in their entirety.

BACKGROUND OF THE INVENTION (1) Field of the Invention

This invention relates to a method of spatially separating the two orthogonal polarization states of an incident optical signal. Its primary use is in integrated optics, where it is often desirable to split and manipulate an optical signal's orthogonal polarizations independently (polarization diversity). It can also be used in polarization mode dispersion (PMD) compensating devices, where the two orthogonal polarizations must be split, processed, then recombined.

(2) Brief Description of Related Art

Light is a vector field that has two primary and orthogonal polarization states or vector directions. These are sometimes referred to as the S and P polarizations in free space optics, or the TE (Transverse Electric) and TM (Transverse Magnetic) modes of optical waveguides. The performance of optical waveguides and optical devices is often sensitive to the polarization state. That is, the response of the device changes as the polarization state changes. This is particularly pronounced in integrated optical waveguides that are fabricated on dielectric substrates.

Typically, it is desirable to have optical components that are insensitive to the input state of polarization. This criteria arises from the fact that in fiber optic telecommunications, the polarization state of an optical signal that has traveled down any length of fiber is unknown, random, and time varying (due to perturbations in the environment). Great care is often taken in the design and fabrication of optical components so that they behave in a polarization insensitive manner. Despite this effort, most devices remain polarization sensitive to some degree, and this affects ultimate performance, yield, and cost. On the other hand, there are some special applications where the two polarization states of an input optical signal needs to be spatially split so each can be manipulated independently. This is the case for example, in PMD (Polarization Mode Dispersion) compensators, where the dispersion of the signal on the two states needs to be equalized. In applications where the polarizations need to be split, the extinction ratio, which is the ratio of wanted to unwanted polarization in either of the two branches, must be high.

Another general way to handle polarization in a device that is required to behave as if it were polarization insensitive is to split the input polarization into two branches having orthogonal states, process each branch independently with devices that are optimized for each polarization respectively, and then recombine the processed signals together. This scheme is referred to as "polarization diversity". It has the advantage that each branch can be specifically optimized for its respective polarization, giving the best performance without otherwise having to comprise the ability to give adequate performance over two polarization states simultaneously. The drawbacks are that twice the number of devices are required, and two polarization splitters are needed to split then recombine the signals. Naturally this adds cost and complexity, but the objective is to net an overall superior performing or higher yielding component.

Traditionally, optical components have been quite large, and polarization diversity schemes have not been popular because of the added size and cost associated with packaging twice the componentry plus the splitters. Prospects for polarization diversity improve for integrated optics fabricated on substrates, where the objective is to shrink the size of components and to integrate various functionalities on a common die or chip, similar in concept to integrated electronic circuits (ICs). In this case the polarization splitters and two sets of components are fabricated all at once. Future integrated optical components are miniaturized by the use of high-index contrast waveguides. High-index waveguides themselves are more susceptible to polarization sensitivity. Polarization diversity may be the only path forward for these future high-index contrast components.

(3) Prior Art

Most polarization beam splitters are bulk optic, and make use of birefringent wave plates. We will not discuss bulk optic polarization splitters here, but only emphasize integrated optic versions.

U.S. Pat. No. 5,946,434 discusses an integrated optic Y-coupler polarization splitter. The splitter works by taking advantage of the difference in waveguide-to-waveguide coupling strengths for two orthogonal polarizations. The optimum structure is a result of an optimized coupling length. Both the coupling length, and the propagation constants are wavelength dependent, and therefore the polarization splitter will have a wavelength dependence, which is undesirable.

U.S. Pat. No. 5,475,771 discusses an integrated optic Y-branching waveguide where one of the branches contains an anisotropic material. The structure requires the integration of an anisotropic material on to the integrated substrate. Such integration is not desirable because the two materials are not well matched in index (leading to scattering loss). Also the fabrication introduces additional steps that impact performance, cost, and yield. Most anisotropic materials can not be deposited by methods used to form the dielectric waveguides.

U.S. Pat. No. 5,293,436 discusses an integrated optic Mach-Zehnder interferometer wherein one branch contains a polable material. Polable materials do not have long term stability, and are not used widely in telecom grade components. The poled materials tend to relax with a certain time constant (that is also affected by environmental conditions), and the performance degrades over time. Further, only certain materials are potable, and very few such materials make good passive low loss optical waveguides.

U.S. Pat. No. 5,151,957 discusses an integrated optic delta-beta coupler configuration in X-cut Lithium Niobate. This method only works in Lithium Niobate, and is therefore not compatible with general integrate optic waveguides and materials.

U.S. Pat. No. 5,133,029 discusses an integrate optic 2×2 beam splitter wherein the set of Y-junctions comprise wave guides of different widths. The wave guides forming the Y-junctions of this device must be comprised of anisotropic materials, and therefore limits the scope of this invention to those integrated optic waveguides using such materials (which is few).

U.S. Pat. No. 5,111,517 discusses an integrated optic Mach-Zehnder in X-cut lithium Niobate. This method only works in Lithium Niobate, and is therefore not compatible with general integrate optic waveguides and materials.

U.S. Pat. No. 5,056,883 discusses an integrated optic Y-branching waveguide where in one branch contains a glassy polable polymer. This invention is similar to U.S. Pat. No. 5,475,771 above, where the anisotropic material is specifically anisotropic polymer material (or a polable polymer material) that is deposited over only one branch of the Y-branching waveguide.

U.S. Pat. No. 4,772,084 discusses an integrated optic 3×3 coupler. This invention is similar in its physical mechanism for polarization splitting as that described in U.S. Pat. No. 5,946,434 above, except that it uses a three-waveguide coupler instead of a two-wave guide coupler, and provides electrodes for post fabrication thermal or electro-optic trimming.

SUMMARY OF THE INVENTION

FIG. 1 shows a schematic of an asymmetric four-port Mach-Zehnder interferometer comprised of two 3-dB couplers 11, 14 or power splitters and two branches 12,13 of lengths $L_1$ and $L_2$ as indicated. Consider the case where the structure is lossless, the waveguides in each branch are identical, and the TE and TM propagation constants of the waveguides are identical. Then the responses at the two output ports are sinusoidal as a function of the branch length difference $L_1-L_2$, and are identical for both the TE and TM polarization states.

More generally, consider the asymmetric four-port Mach-Zehnder in FIG. 1 wherein the waveguides in paths 1 and 2 are not identical, and the respective propagation constants of each of the waveguides are polarization sensitive. Then the responses are sinusoidal functions of the optical phase difference between the two paths for each polarization, given as $$\Delta\phi^e = \frac{2\pi}{\lambda}(N_1^e L_1 - N_2^e L_2) \quad (1)$$

$$\Delta\phi^h = \frac{2\pi}{\lambda}(N_1^h L_1 - N_2^h L_2) \quad (2)$$

where $\Delta\phi^e$ and $\Delta\phi^h$ are the phase differences for the TE and TM modes respectively, $N_1^e$ and $N_2^e$ are the modal effective indexes of the TE mode in branch 1 and branch 2 respectively, $N_1^h$ and $N_2^h$ are the modal effective indexes of the TM mode in branch 1 and branch 2 respectively, and $\lambda$ is the wavelength. In the lossless case, output ports 1 and 2 are complementary. That is, the sum of the power at the two output ports is equal to the input power.

The objective of a polarization splitter in this invention is to have one polarization appear at output port 1, and the orthogonal polarization to appear at output port 2. It is also an objective to minimize the unwanted polarizations at each port. A figure of merit commonly used is the Extinction Ratio (E.R.). This is the ratio of wanted to unwanted power in each polarization for each port. In the Mach-Zehnder configuration, one output port for one polarization will have maximum transmission when the phase difference between paths is equal to $$\Delta\phi^e = \pi + 2N\pi, \text{ where } N \text{ is some integer} \quad (3)$$

The other output port, for the second polarization will have a maximum when the phase difference is equal to $$\Delta\phi^h = 2M\pi, \text{ where } M \text{ is some integer} \quad (4)$$

When the transmission is a maximum in one output port, it will be a minimum in the other output port. The design criteria for constructing a polarization splitter is to chose the path lengths $L_1$ and $L_2$, and the effective indexes $N_1^h$, $N_1^e$, $N_2^h$, and $N_2^e$ in such a way that equations (3) and (4) are simultaneously satisfied for some set of integers N and M.

In any polarization splitter design based on a Mach-Zehnder configuration, one must be able to design and fabricate waveguides that have substantially different propagation constants for the TE and TM modes. The term "birefringent" is used to describe the condition where the TE and TM modes of a single waveguide have different propagation constants. "Small" and "large" birefringence are terms used to describe conditions where the TE and TM modes are nearly identical, and far from identical, respectively. In the literature and in patent disclosures, birefringence is typically induced by poling a material having certain symmetries, such as Lithium Niobate, or by the anisotropic electro-optic effect in certain materials such as Lithium Niobate or Indium Phosphide. These types of birefringences are termed material birefringence because the material exhibits different indexes of refraction depending on the polarization state.

The invention described here makes use of form birefringence, also known as waveguide birefringence, and does not rely on material birefringence. Form birefringence is related to the waveguide geometry and structure, and can be induced in a number of ways, including the following.

1. Changing the width of a waveguide. (FIG. 2) Changing the width of a waveguide with a lower cladding 21, a core 221, an upper cladding 23, and a cover 24 (while its thickness remains the same) changes both the average effective index, and the difference between the TE and TM effective indexes. In low index contrasts waveguides (where the core-to-cladding refractive index difference is less than about 0.02), the birefringence induced by changing the waveguide width is very small. However, as the index contrast increases, so does the change in birefringence. For index contrasts larger than 0.05, the induced birefringence is large enough to realize robust polarization splitters, as we demonstrate. FIG. 2 shows a non-birefringent square waveguide 221, and a waveguide 222 having birefringence induced by narrowing the width.

2. Creating non-homogeneous waveguides. A homogeneous waveguide is one where the refractive index of the waveguide core is the same everywhere within the guiding core, and the refractive index of the cladding is the same everywhere within the vicinity of the core (practically, within 10 um of the core). Non-homogeneous means that the index within the core, or within the cladding, has a spatial variation. Layered or striated materials are also considered non-homogeneous. A non-birefringent waveguide can be made birefringent by placing a thin high-index layer 223 (higher index than the core) above or beneath the guide, as shown in FIG. 3.

3. Birefringent Material Overlay. The method of 2 above can be generalized to a thin layer 224_of any index, but having a material birefringence. Example of overlays are stressy SiN, or polymers, as shown in FIG. 4.

Form birefringence is a method to design the effective indexes $N_1^h$, $N_1^e$, $N_2^h$, and $N_2^e$ independently. This design freedom, in addition to the ability to specify $L_1$ and $L_2$, means that equations (3) and (4) can be satisfied simultaneously, and therefore, polarization splitters can be realized.

DETAILED DESCRIPTION OF THE INVENTION

Figure 5:
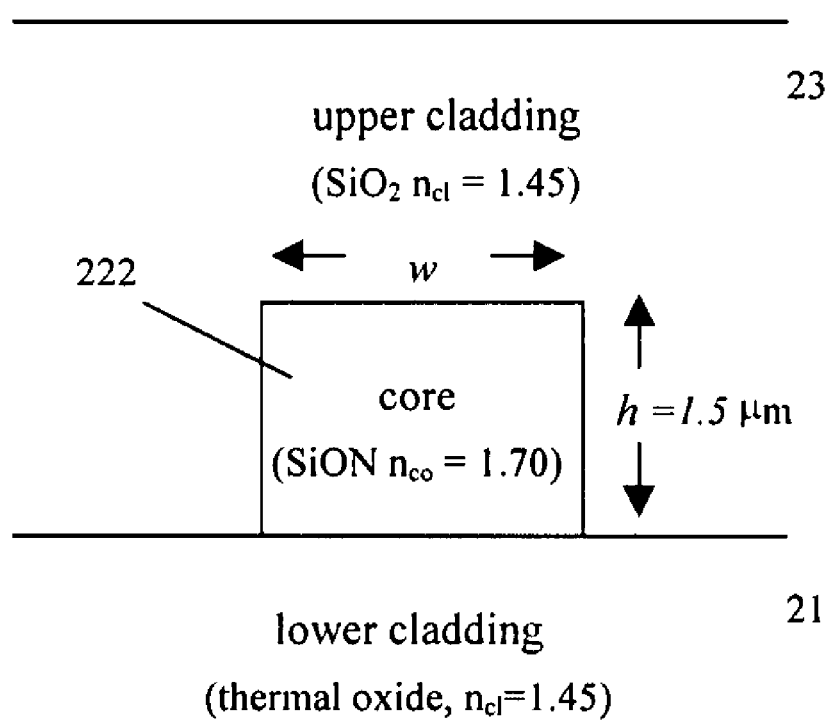
FIG. 5 shows the design of a form-birefringent waveguide.

Consider the waveguide structure that is shown in cross section in FIG. 5. The core material is silicon oxynitride (SiON) with a refractive index of $n_{co}$=1.70. In one embodiment, the upper and lower claddings are silica ($SiO_2$) and thermal oxide (thermally grown $SiO_2$) respectively, both with an index of $n_{cl}$=1.45. SiON and $SiO_2$ can be deposited by chemical vapor deposition (CVD), which is well known in the integrated optics and semiconductor fields. Silica can also be deposited by flame hydrolysis (FHD), or by sputtering. Other suitable core materials include silicon nitride (SiN), silicon (Si), silicon oxycarbide and Tantalum oxide-silica ($Ta_2O_5$: $SiO_2$). The Tantalum oxide-silica is typically sputter deposited, and the other suitable core materials are typically deposited by CVD (chemical vapor deposition), or LPCVD (Low pressure CVD), and can also be sputtered. Other materials suitable for the core and/or the upper and/or lower cladding include Indium Phosphide compounds, Gallium Arsenide compounds, and high index contrast polymers. As will be understood by one skilled in the art, the constituent parts of the materials forming the core, upper cladding and/or lower cladding can be varied in accordance with the present invention to provide a preferable core to cladding index contrast ($n_{co}-n_{cl}$) larger than 0.05, and we call such contrasts "high-index contrast". The desired waveguide height h can vary between 0.5 um to 4.0 um for high index contrast guides operating at a wavelength near λ=1.55 μm Here it is selected as h=1.5 μm. The height is typically chosen so that the waveguide is single moded at the wavelength of interest. The width w will be varied to give a certain amount of form birefringence.

Using rigorous numerical models (Apollo Photonics, Inc. OWMS Suite), it is found that the effective indexes for the TE mode ($N^e$) and the TM mode ($N^h$) at a wavelength of 1.55 μm follow the relations below as a function of waveguide width w, $$N^e = 1.64233 - 0.325\exp[-1.5456w] \quad (5)$$

$$N^h = 1.63563 - 0.325\exp[-1.5456w] + 0.0547\exp[-1.339w] \quad (6)$$

The birefringence, which is the difference between the TE and TM effective indexes is, $$N^e - N^h = 0.0067 - 0.0547\exp[-1.339w] \quad (7)$$

For a waveguide width of w=1.50 μm (square waveguide), the birefringence approaches zero.

Figure 6:
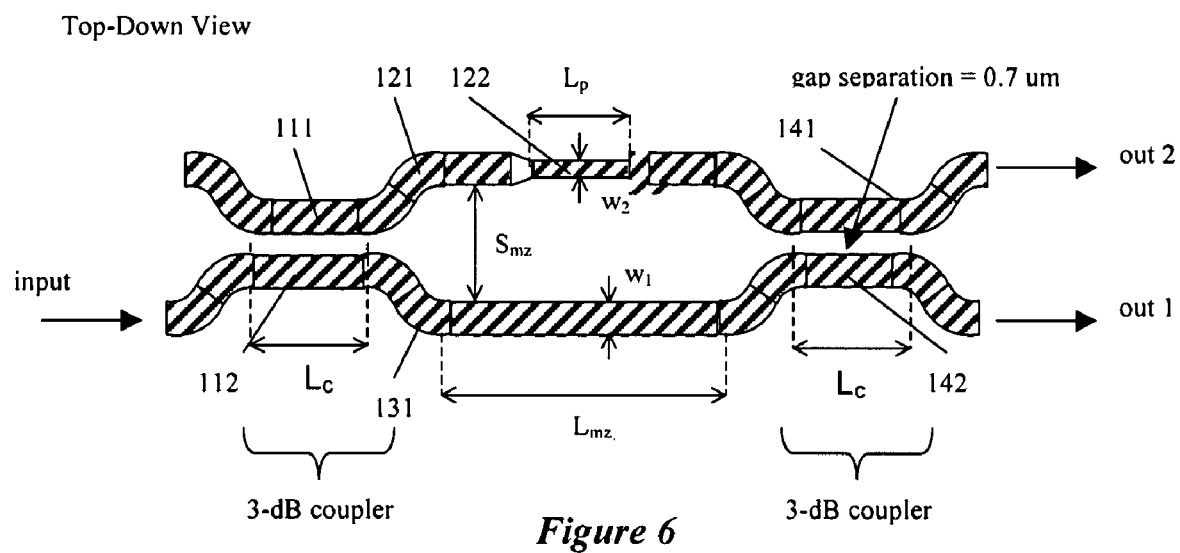
FIG. 6 shows the top-down view of the first embodiment of the waveguides for the polarization splitter of the present invention.

The waveguide structure described above is used in the Mach-Zehnder configuration depicted in FIG. 6. The Mach-Zehnder consists of two directional coupler type 3-dB couplers 111, 112 and 141, 142. The nominal waveguide width in the couplers is 1.50 μm. The coupler lengths are chosen from simulation to be 45 μm, and the cores are separated by 0.7 μm. All the waveguide bends have radii of 300 μm. The nominal width of the waveguides is 1.5 μm. The path lengths in the Mach-Zehnder branches are set equal here, $L_1=L_2=L_{mz}$. There is a section of waveguide 122 (labeled $w_2$) having a width of 0.8 μm in one arm of the interferometer. In this section the waveguide is tapered from a width of 1.5 μm to 0.8 μm over a length of 8 μm. By narrowing the waveguide to a width of 0.8 μm, a certain amount of birefringence is induced according to equation (7). The length of the narrowed section is chosen to be the polarization beat length, $L_p$. The polarization beat length is the length over which the TE and TM modes accumulate a phase difference of π. It is given by the relation, $$L_p = \left| \frac{\lambda}{2(N^e - N^h)} \right| \quad (8)$$

Figure 1:
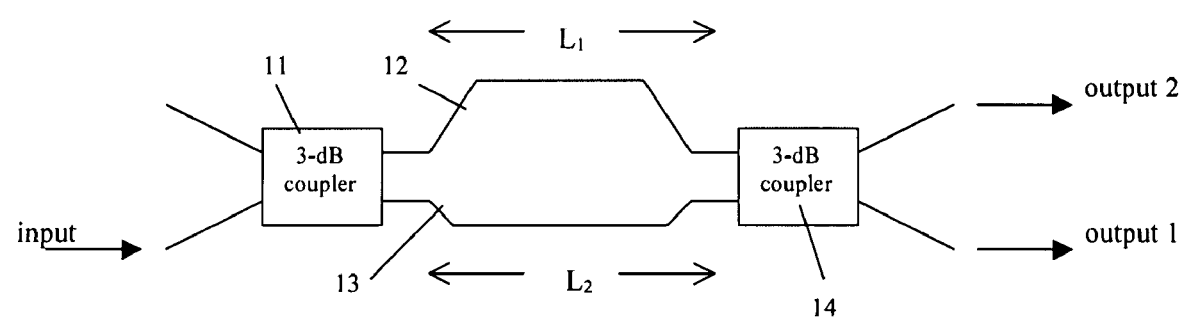
FIG. 1 shows a schematic of an asymmetric four-port Mach-Zehnder interferometer.
Figure 2:
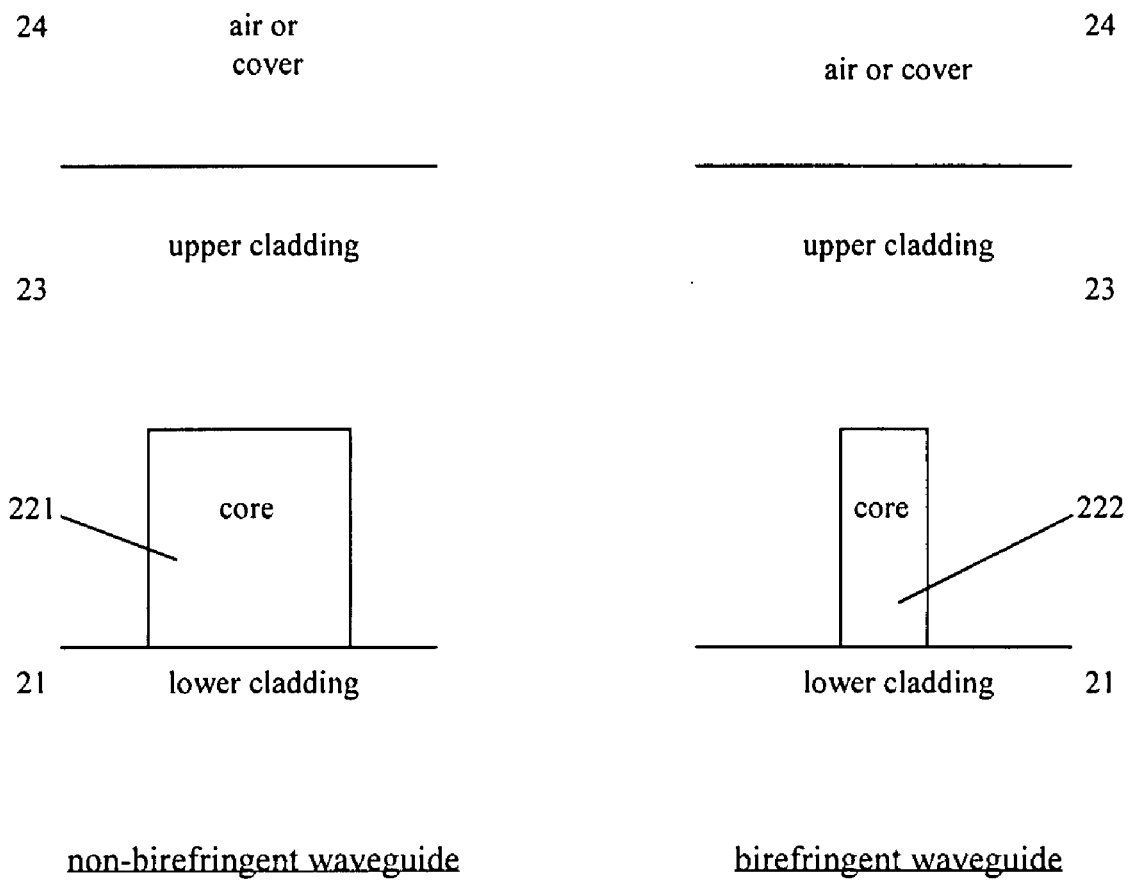
FIG. 2 shows the cross-section of a birefringent waveguide with narrower core.
Figure 7:
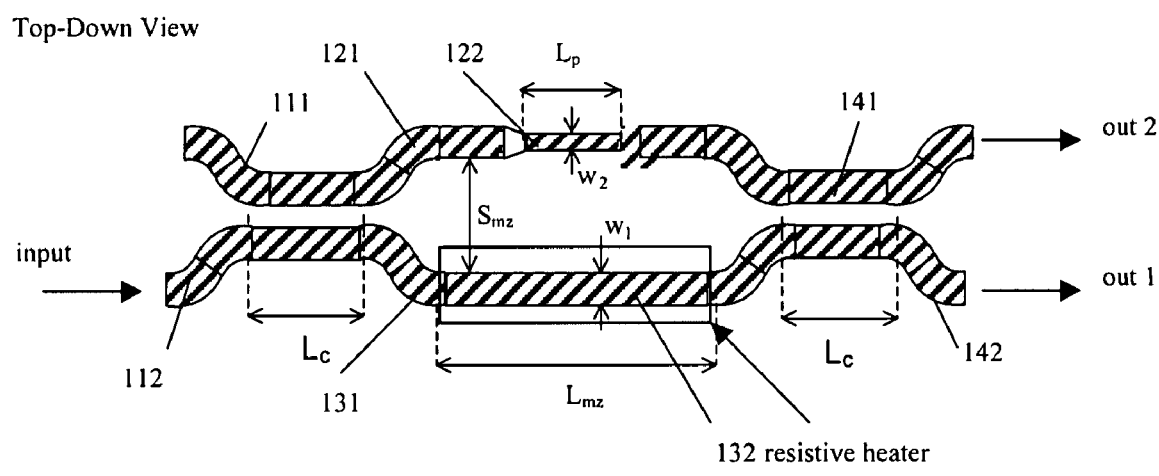
FIG. 7 shows the top-down view of the second embodiment of the waveguides for the polarization splitter with a heated section.

From (7) $L_p$ is calculated to be 64 μm at λ=1.55 μm. As outlined earlier in equations (3) and (4), two conditions must be met to have a high extinction ratio. Relation (8) is one condition. In order to satisfy (3) and (4) simultaneously, one can vary the waveguide width $W_2$ simultaneously with varying $L_p$. Another method is to change the difference in path lengths between the upper and lower branches of the Mach-Zehnder ($L_1$ and $L_2$ from FIG. 1). A third method is to change the index of one of the branches by use of the thermal optic effect. FIG. 7 shows the forgoing polarization splitter with a resistive heater 132 placed over one of the arms. Current injected into the resistor will heat that arm and can be used as a tuning or trimming mechanism. The heater changes the effective indexes of both polarizations by nearly the same amount, and does not itself induce significant birefringence. The heater used in the demonstration consisted of 200 nm of platinum deposited by an evaporator.

Figure 8:
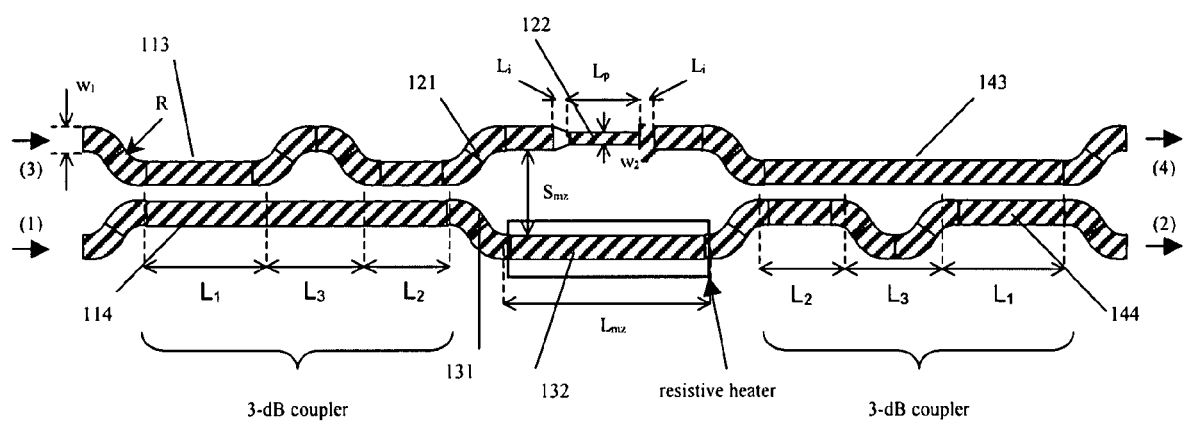
FIG. 8 shows the top-down view of the third embodiment of the waveguides for the polarization splitter using a Mach-Zehnder balanced coupler as 3-dB couplers.

A further improvement is shown in FIG. 8, where the simple directional coupler type 3-dB couplers depicted in FIGS. 6 and 7 are replaced by Mach-Zehnder balanced coupler[1] 113,114 and 143,144. The balanced couplers are 3-dB couplers with improved fabrication latitude and are more wavelength-independent compared to conventional directional couplers. 6 [1] B. E. Little et. al. "Design rules for maximally-flat wavelength-insensitive optical power dividers using Mach-Zehnder structures", Optics Lett. Vol., pp. 1998.

Figure 9:
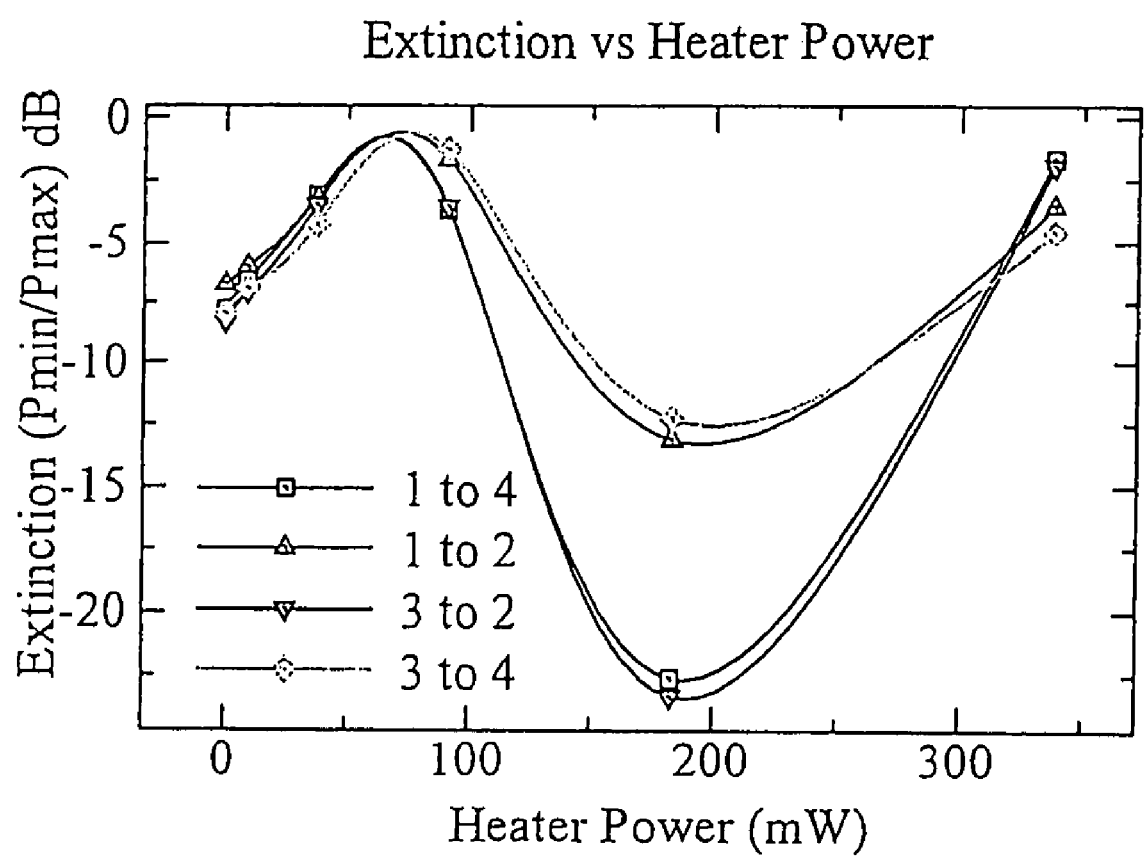
FIG. 9 shows data taken from a fabricated polarization-splitter shown in FIG. 8.

Data taken from the fabricated device in FIG. 8 is shown in FIG. 9. The numeric labels correspond to the port labeling of FIG. 8. The graph is a plot of extinction ratio as a function of thermal tuning power applied to the resistive heater. Extinction ratio is the ratio of the power in one polarization state (wanted polarization) compared to the other state (unwanted polarization). As seen, the extinction ratios can be tuned up to 25 dB. Thus the heater gives a post fabrication method to optimize the performance. These polarization splitters can be cascaded output-to-input to increase the extinction ratios.

Figure 3:
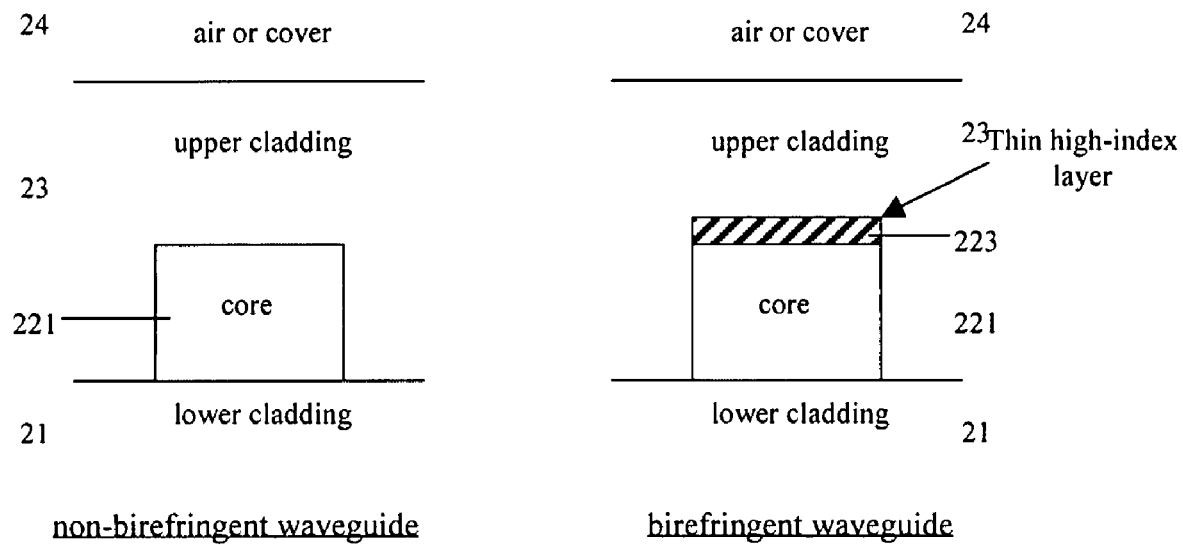
FIG. 3 shows the cross-section of a birefringent waveguide with a thin high index layer.
Figure 4:
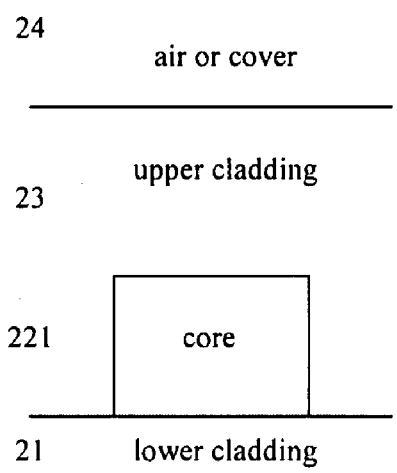
FIG. 4 shows the cross-section of a birefringent waveguide with a thin birefringent layer.
Figure 4:
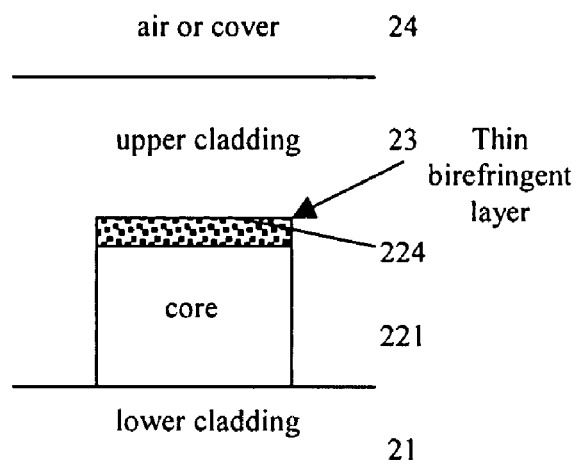
Figure 10:
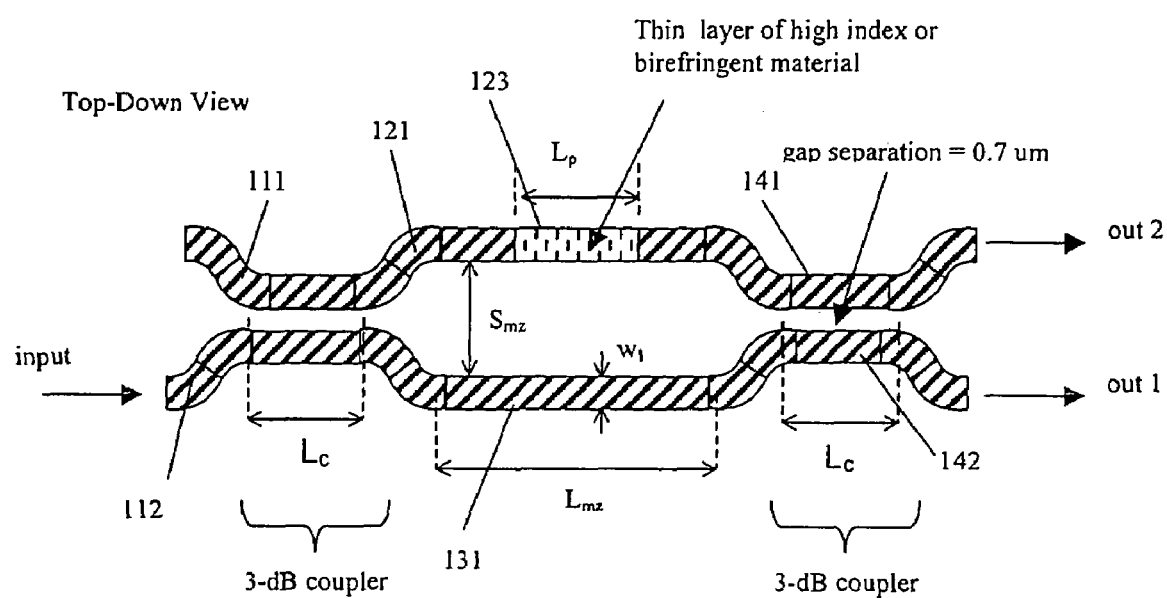
FIG. 10 shows the top-down view of a fourth embodiment of the waveguides for the polarization splitter.

FIG. 10 shows the top view of another embodiment of the invention. The structure is similar to that shown in FIG. 6. Compared to FIG. 6, in this case there is no narrow section of waveguide on the upper branch. Instead, there is a section 123 of waveguide on the upper branch that has a thin layer of additional material. The material can be a thin high index layer as described in conjunction with FIG. 3, or a thin birefringent layer as described in conjunction with FIG. 4. The length of waveguide having this material layer is $L_p$. This thin layer of high index or birefringent material can replace the narrow section of waveguide of width $w_2$ in FIGS. 7 and 8.

Figure 11:
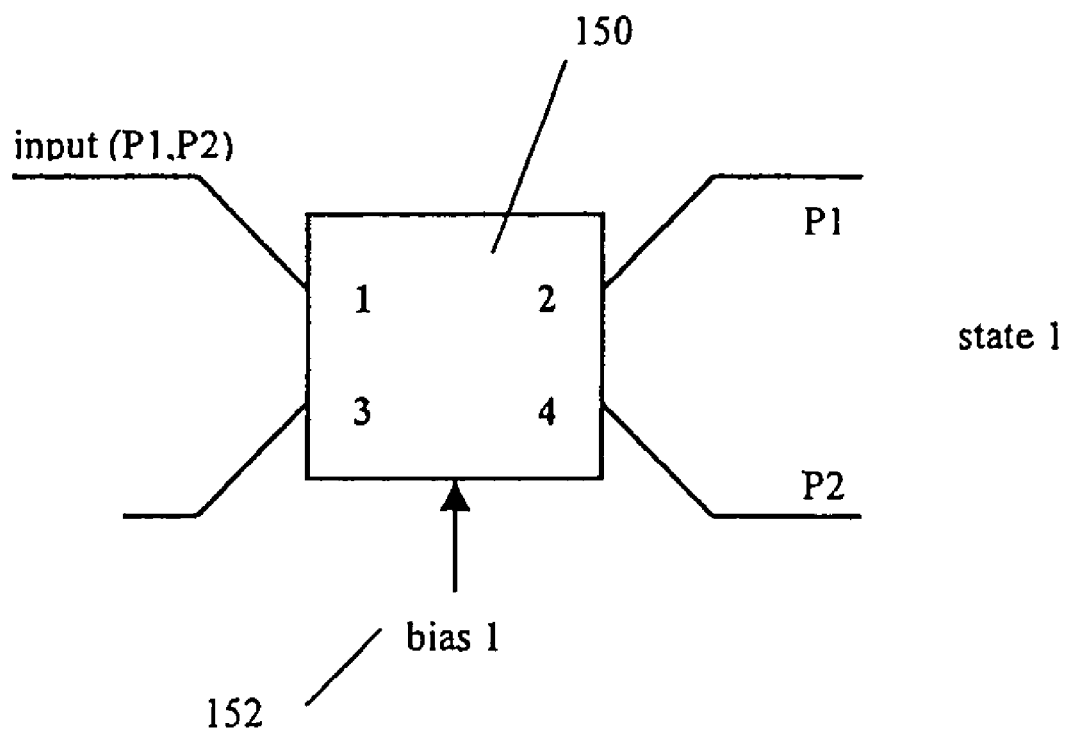
FIG. 11 shows the polarization splitter as a functional block diagram and shows two operating states of the device.
Figure 11:
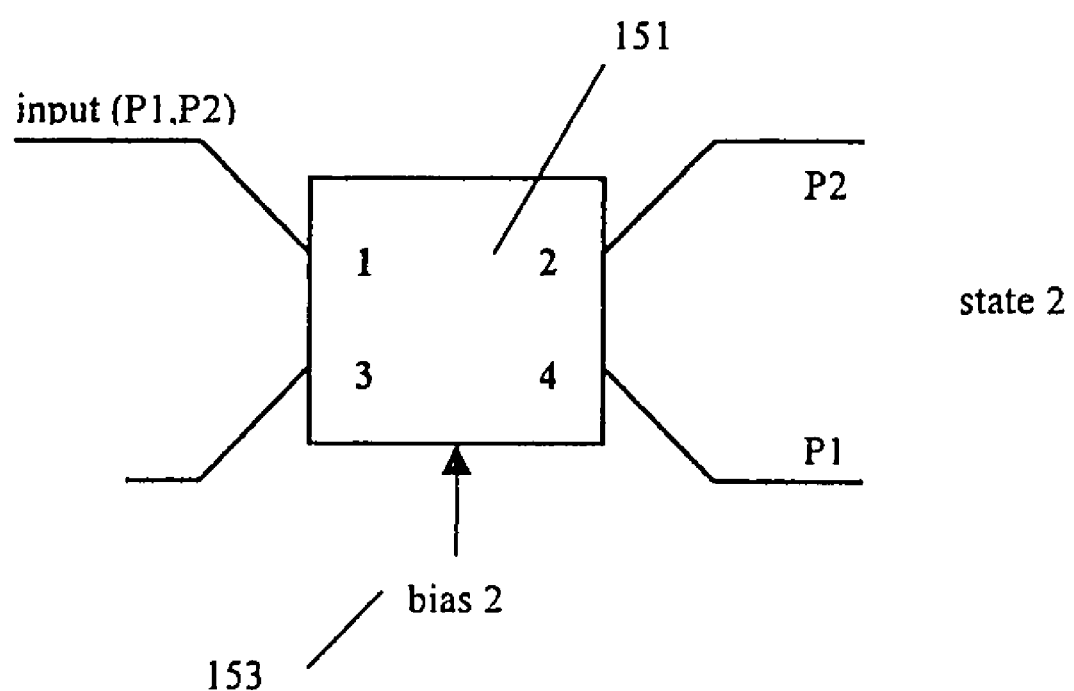

FIG. 11 shows a functional block diagram of the polarization splitters 150 and 151. The device has two inputs labeled "1" and "3", and two outputs labeled "2" and "4", similar to the physical structure shown in FIG. 8. The polarization splitter separates the constituent polarization states P1 and P2 at the input into two physically separated output ports. In an optimized configuration, substantially all of the power in one polarization state comes out one output port, while substantially all of the power in the other polarization state comes out the second output port. There are two possible optimum states for this device as shown in FIG. 11. In one state, labeled as "state 1" in FIG. 11 150, substantially all of the power in polarization P1 comes out of output port 2, while substantially all of the power in polarization P2 comes out of output port 4. In the second state, labeled as "state 2" in FIG. 11 151, substantially all of the power in polarization P1 comes out of output port 4, while substantially all of the power in polarization P2 comes out of output port 2. It is possible switch from state 1 to state 2 by applying a bias 152,153 to a thermal heater on the structure as indicated previously in FIGS. 7, 8, 9. FIG. 9 shows experimental evidence that the extinction ratio can be controlled and changed by applying energy to the thermo-optic heater. We say that the polarization state at the output of the device can be "toggled" between two states by applying a bias in a manner consistent with FIGS. 7-9.

Figure 12:
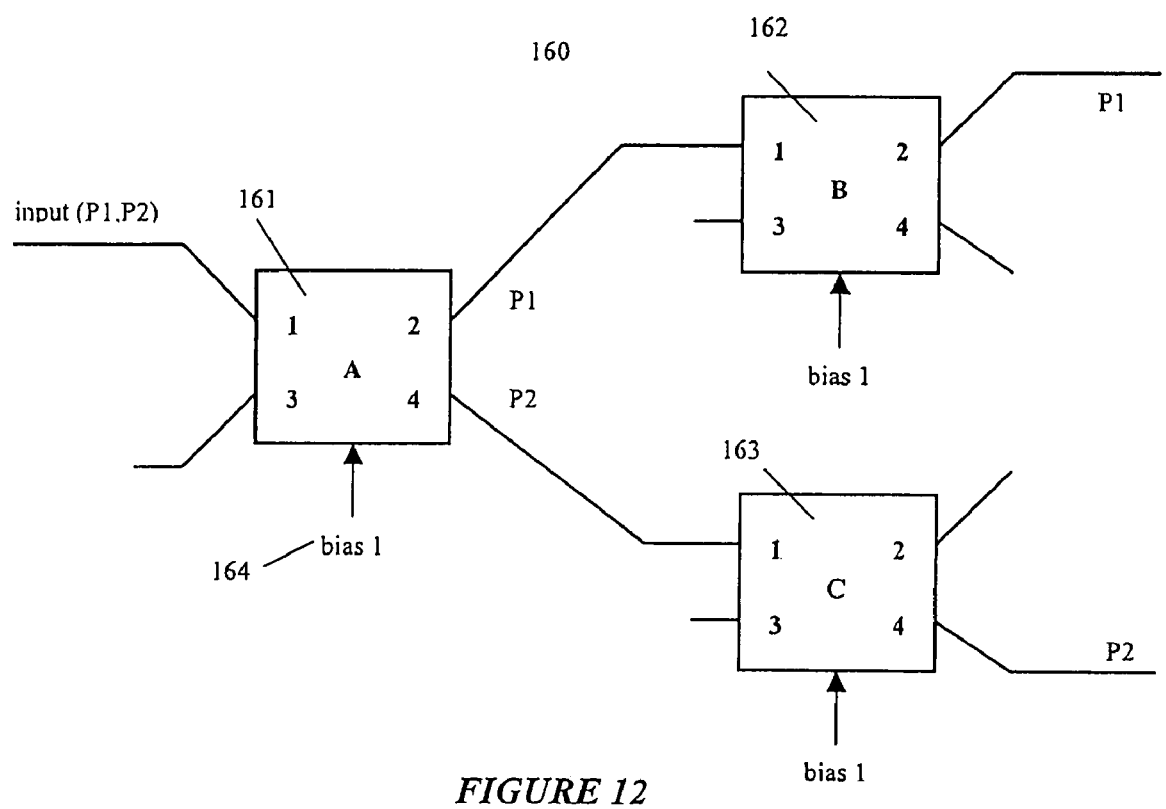
FIG. 12 shows a cascade of polarization splitters used to increase the extinction ratio and optimize the performance.

FIG. 12 shows a cascade of polarization splitters 160 used to increase the extinction ratio at the final output ports. In this case there are three polarization splitters labeled "A" 161, "B" 162, and "C" 163. The input is first connected to polarization splitter A. Polarization splitter A has some bias "bias 1" 164 so as to operate in some state called "state 1" similar to that shown in FIG. 11, where polarization P1 comes out of port 2 of splitter A, and polarization P2 comes out of port 4 of splitter A. Port 2 of splitter A becomes the input to port 1 of splitter B. Port 4 of splitter A becomes the input to port 1 of splitter C. Splitters B and C are similar to splitter A. FIG. 12 connects identical devices in an output-to-input configuration. All devices are operated in the same bias mode or state, with perhaps some trimming on the biases to compensate for fabrication deviations. The final extinction ratios of the output ports are a multiplication of the extinction ratios of each port of each device.

Figure 13:
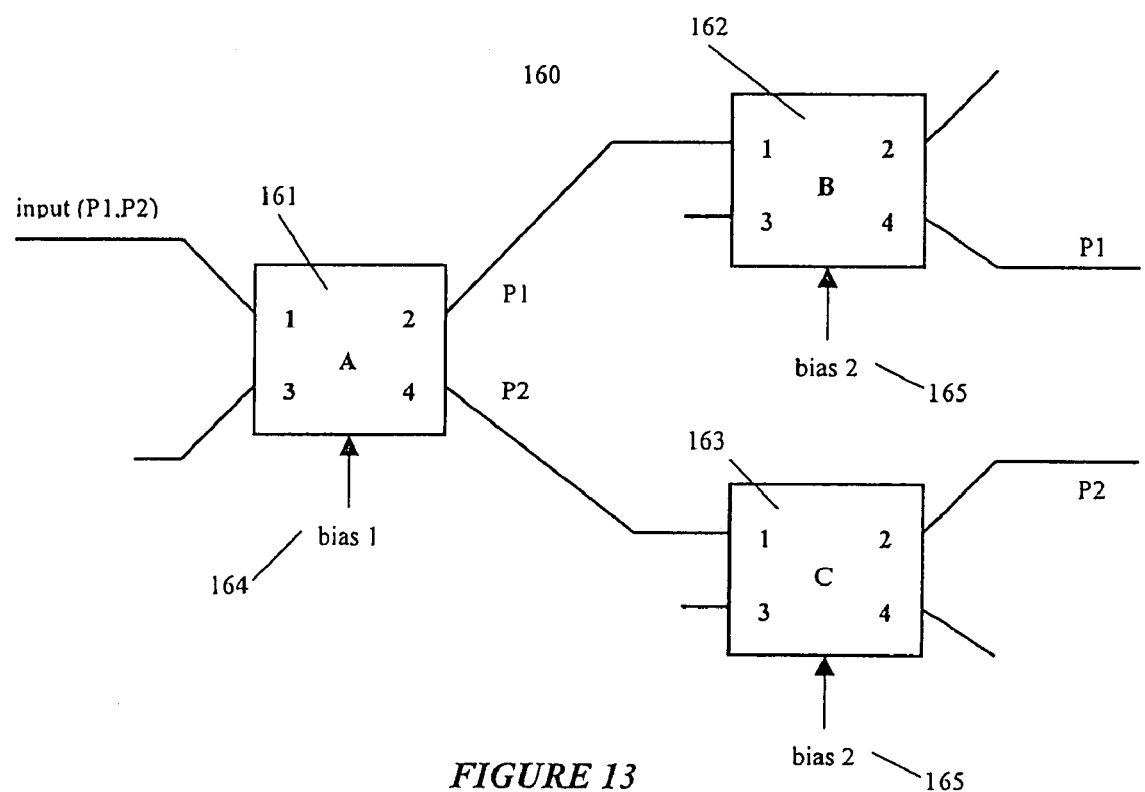
FIG. 13 shows a cascade of polarization splitters used to increase and equalize the extinction ratio and optimize the performance.

The optimized extinction ratios for the polarizations at output ports 2 and 4 with input at port 1 (see FIG. 11), may not be identical, as shown by experimental values in FIG. 9. For example, FIG. 9 shows that the extinction ratio for the polarization that goes from port 1 to port 4 is better than for the polarization that goes from port 1 to port 2. Therefore, the extinction ratios for polarization P1 and for P2 in the cascade configuration shown in FIG. 12 may not be identical. One method to make them identical is to operate the cascade such that splitter A, and splitters B and C are operated in different states, as shown in FIG. 13. Note that the bias on splitter A 164 is different than that bias on splitter B and C 165. For example, by tracing out polarization state P1, the extinction ratio for P1 is a product of going from ports 1 to 2 in splitter A, and from ports 1 to 4 in splitter B. Likewise tracing out polarization state P2, the extinction ratio for P2 is a product of going from ports 1 to 4 for in splitter A, followed by going from ports 1 to 2 in splitter C. Therefore the extinction ratios at the final two output ports are equalized.

While the preferred embodiments have been described, it will be apparent to those skilled in the art that various modifications may be made to the embodiments without departing from the spirit of the present invention. Such modifications are all within the scope of this invention.

What is claimed is:

1. An optical polarization beam splitter, comprising:
an input optical coupler configured to split an incident optical signal into first and second optical signal portions, the incident optical signal having first and second orthogonal polarization states, the input optical coupler including a first waveguide branch and a second waveguide branch, such that the first optical signal portion is supplied to the first waveguide branch and the second optical signal portion is supplied to the second waveguide branch, the first waveguide branch including a birefringent section having form birefringence and including a birefringent layer and a core layer, wherein the birefringent layer is coated on and in contact with the core layer, the first and second waveguide branches being configured to supply the first and second optical signal portions, respectively; and
an output optical coupler configured to receive and combine the first and second optical signal portions, the output optical coupler having first and second ports, wherein the first port supplies a first output optical signal having the first orthogonal polarization and the second port supplies a second output optical signal having the second orthogonal polarization, the first output optical signal is substantially without light having the second orthogonal polarization and the second optical signal is substantially without light having the first orthogonal polarization.

2. An optical polarization beam splitter in accordance with claim 1, wherein each of the input and output optical couplers includes a 3 dB coupler.

3. An optical polarization beam splitter in accordance with claim 1, wherein the first polarization state corresponds to a transverse electric (TE) mode and the second polarization state corresponds to a transverse magnetic (TM) mode.

4. An optical polarization beam splitter in accordance with claim 1, wherein a width of the birefringent section is less than a width of the second waveguide branch.

5. An optical polarization beam splitter in accordance with claim 1, further comprising a heater configured to adjust a temperature of a portion of the second waveguide branch.

6. An optical polarization beam splitter in accordance with claim 5, wherein in response to said adjusted temperature, the first output optical signal has the second orthogonal polarization and the second output optical signal has the first orthogonal polarization, the first output optical signal is substantially without light having the first orthogonal polarization and the second optical signal is substantially without light having the second orthogonal polarization.

7. An optical polarization beam splitter in accordance with claim 1, further comprising a heater configured to adjust a temperature of the birefringent layer.

8. An optical polarization beam splitter in accordance with claim 7, wherein in response to said adjusted temperature, the first output optical signal has the second orthogonal polarization and the second output optical signal has the first orthogonal polarization, the first output optical signal is substantially without light having the first orthogonal polarization and the second optical signal is substantially without light having the second orthogonal polarization.

9. An optical polarization beam splitter in accordance with claim 1, wherein each of the input and output couplers includes a Mach-Zehnder balanced coupler.

10. An optical polarization beam splitter in accordance with claim 1, wherein the core layer includes a material selected from the group consisting of silicon oxynitride (SiON), silicon nitride, silicon oxycarbide, silicon (Si), and tantalum oxide-silica ($Ta_2O_5:SiO_2$).

11. An optical polarization beam splitter in accordance with claim 1, further comprising:
an upper cladding including silica ($SiO_2$); and
a lower cladding including a thermal oxide, the upper and lower claddings being configured to encapsulate the first waveguide branch.

12. An optical polarization beam splitter in accordance with claim 1, further comprising a cascade of beam splitters provided between the first and second couplers.

13. An optical polarization beam splitter in accordance with claim 12, wherein a first stage of the cascade is configured to pass first optical energy having the first orthogonal polarization and the second stage of the cascade is configured to pass second optical energy having the second orthogonal polarization.

14. An optical device in accordance with claim 1, wherein a contrast between a refractive index associated with the core layer and a refractive index associated with the birefringent layer is greater than 0.05.

* * * * *